2,934,531
Patented Apr. 26, 1960

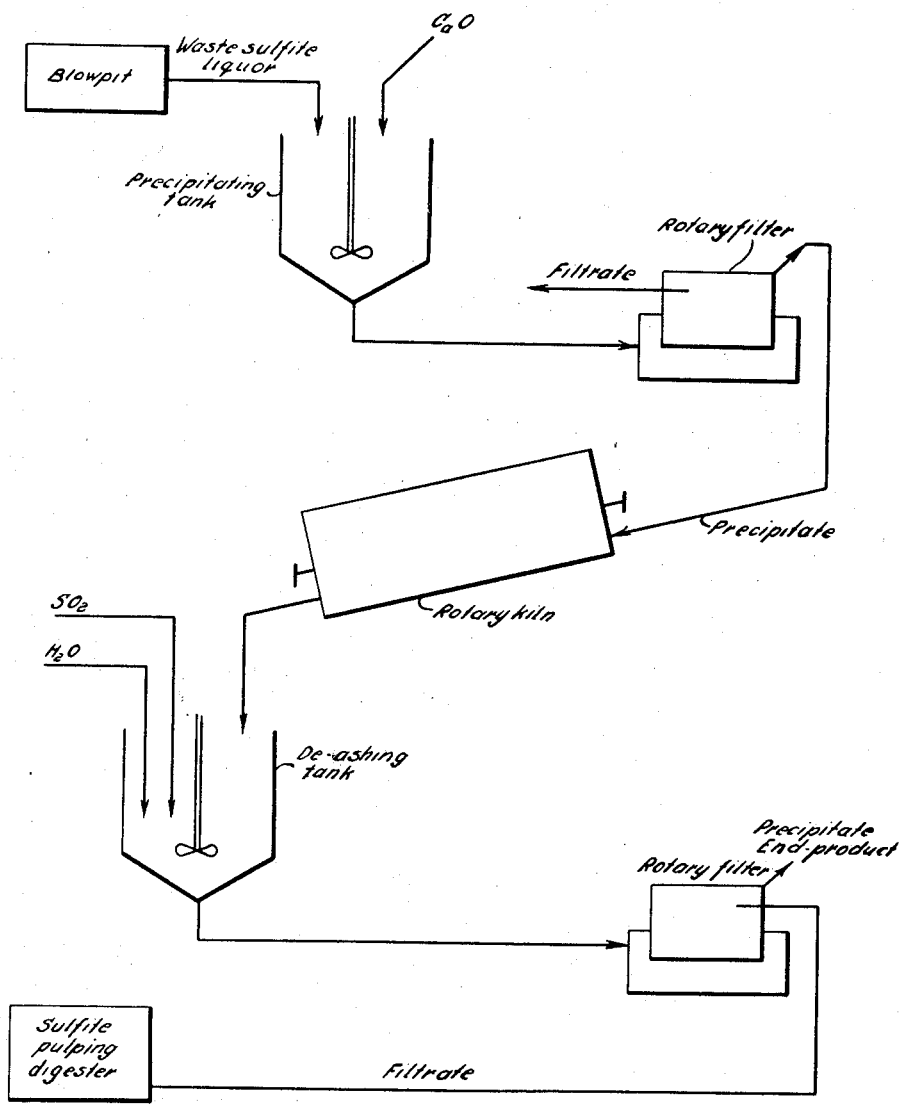

United States Patent Office

2,934,531

MANUFACTURE OF LIGNIN DERIVATIVES

John L. Gardon and Bengt Leopold, Hawkesbury, Ontario, Canada, assignors to Canadian International Paper Company, Montreal, Quebec, Canada, a corporation of Canada Application December 2, 1957, Serial No. 699,997

2 Claims. (Cl. 260—124)

This invention relates to new and useful improvements in the recovery of ligneous matter from sulphite waste liquor and particularly seeks to provide a novel process for obtaining modified lignin products of high reactivity, in a solid-solid reaction under alkaline conditions.

More specifically it describes the preparation of relatively high-molecular lignin products of high carbonyl and phenolic hydroxyl content, capable of crosslinking on heating without the addition of other compounds, such as phenols or aldehydes.

It is generally known that when solid lime is added to sulphite waste liquor at temperatures lower than 100° C. a precipitate is obtained consisting of lime and basic calcium lignin sulphonates. In this type of precipitation the lignin sulphonates do not suffer any appreciable structural changes but retain their polar hydrophilic nature.

It is also known that when lignin sulphonates are heated with alkaline reagents at temperatures up to 200° C., sulphonic acid groups are split off, and consequently the lignin becomes more hydrophobic. Such lignin products have been suggested for the use as extenders or substitutes for thermosetting resins and adhesives. However, such lignin products all suffer from the disadvantage of low reactivity and poor quality of the cured resin, and can normally only be converted to acceptable resins by the addition of substantial amounts of chemicals such as phenols and/or aldehydes.

We have discovered that when neutral or basic lignin sulphonate salts are heated to temperatures in the range of 220 to 350° C., but preferably from 250 to 290° C., at substantially atmospheric pressure in the presence of an excess of lime or other solid alkaline agents and in the absence of water or wet steam, a lignin product of high carbonyl and phenolic hydroxyl content is formed in a strongly exothermic reaction. This product is of relatively high molecular weight, as shown by its insolubility in ether and other relatively non-polar solvents. On the other hand it is cross-linked to only a limited extent, as shown by its solubility in alcohol and other polar solvents. On heating the product cures very rapidly, without any additions, to form a strong, tough, water-resistant binder.

A further feature of this novel product is its high reducing power which may make it useful in certain applications where atmospheric oxidation is to be prevented.

A possible explanation of this unexpected result is the following:

Normally, desulphonated lignin contains a relatively small number of phenolic hydroxyl groups and carbonyl groups, and the possibilities of forming cross-links on heating are quite limited. The formation of a cross-linked resin can therefore only be achieved by the addition of a phenol and/or aldehyde, and the lignin acts essentially as an extender.

The product obtained according to the process of the present invention, on the other hand, contains a substantial number of carbonyl groups and phenolic hydroxyl groups and is thus capable of forming cross-links on heating. It can be said that the lignin obtained according to this process is similar to a B stage phenol formaldehyde resin in its solubility and curing characteristics.

Accordingly, an object of this invention is to provide a novel process for obtaining highly reactive lignin products of high carbonyl and phenolic hydroxyl content in a solid-solid reaction under alkaline conditions.

A further object of this invention is to provide a process of the character stated which includes the step of heating a reaction mixture consisting of a lignin sulphonate salt and a solid alkaline reagent in the dry state to about 220° to 350° C. at atmospheric pressure.

A further object of this invention is to provide a process of the character stated which includes the steps of precipitating basic lignin sulphonate from waste sulphite liquor with an excess of a solid alkaline reagent, drying the precipitated basic lignin sulphonate, and then calcining it at atmospheric pressure to about 220° to 350° C.

A further object of this invention is to provide a process of the character stated in which the calcined lignin product is de-ashed with an aqueous mineral acid.

A further object of this invention is to provide a process of the character stated in which the alkaline reagent is selected from the group consisting of the oxides, hydroxides and carbonates of alkaline earth metals.

This application is a continuation-in-part of our co-pending application Serial No. 619,430, filed October 31, 1956, now abandoned.

The sole figure in the drawing is a flow diagram by which the process of this invention may be practiced.

The starting materials for this dry state desulphonation consist of a dry lignin sulphonate preparation and a solid basic reagent. Suitable reaction mixtures can be prepared by either (1) filtering off the product obtained by the precipitation of basic lignin sulphonates from waste sulphite liquor with an excess of solid lime under atmospheric pressure, or (2) mixing an excess of lime with the sulphite waste liquor and/or sulphite waste liquor concentrate and drying this mixture, or (3) mixing dried sulphite waste liquor solids with lime in the dry state, wetting the mixture uniformly to yield a paste and drying the same, or (4) mixing thoroughly any kind of neutral or alkaline lignin sulphonate salt preparation with any kind of solid alkaline reagent, e.g., sodium hydroxide, potassium hydroxide, magnesium hydroxide, or magnesium oxide, to yield a dry reaction mixture, in a manner familiar to those versed in the art.

We prefer to carry out the drying and the subsequent heat treatment of any of the aforementioned reaction mixtures in one stage, but these operations can also be carried out separately. We also prefer the use of a directly heated continuous rotary oven or kiln for this purpose, but any other kind of equipment can also be used in which the reaction mixture can be heated to the desired temperature.

After the calcination is completed, the ligneous matter in the reaction mixture may be freed from minerals (de-ashed) in aqueous suspension. For de-ashing we prefer to apply sulphurous acid and subsequently use the filtrate containing the lime as calcium bisulphite in the cooking acid for the acid pulping of wood, but other acids, such as hydrochloric acid, may also be used for de-ashing. After de-ashing the ligneous end-product is filtered and washed. The whole procedure is illustrated as a flow sheet in the single figure of the drawing.

The yield and the composition of the de-ashed ligneous end product depend primarily upon the highest temperature attained by the reaction mixture during the desulphonation reaction, less upon the time during which this temperature is maintained, and only to a limited extent upon the nature and amount of the alkaline desulphonating agent, as long as this agent is present in excess to render the reaction mixture alkaline. Increasing reaction temperature increases the yields, carbonyl contents, phenolic hydroxyl contents, and decreases the sulphur contents. Reaction temperatures higher than 350° C. however, lead to products insoluble in alcohol and other polar solvents, possibly indicating that a cross-linking has taken place. The yields, calculated on basis of the lignin sulphonates initially present in the reaction mixture and the quantity of de-ashed ligneous end-product obtained, may be as high as 85%. The sulphur content of the ligneous matter is generally reduced from the initial 5 to 7% to 1.8 to 3%. The ash content of the de-ashed product may range from 2 to 6%. The pH of the de-ashed product dissolved in 60% aqueous alcohol solution, or suspended in water, is between 2.5 and 4.5.

The carbonyl content can vary from 0.45 to 2.1 milliequivalents per gram and the total hydroxy content from 4.1 to 7.0 milliequivalents per gram.

*Example 1*

A suspension of 2.8 kg. of calcium hydroxide in 5 liters of water was stirred at 75° C. into 75 liters of sulphite waste liquor containing 10.5 kg. of solids. The resulting precipitate (6.1 kg.) was filtered and dried.

Portions of 2 kg. were then calcined at varying temperatures in a small gas-heated kiln provided with a stirrer for 1½ hours. After calcination the reaction mixture was stirred with an excess of $SO_2$ dissolved in water. The resulting solid was filtered off, washed with water and dried. The properties of the products are shown in the following table. The products are all insoluble in ether.

the feed and 280° C. at the discharge end. After having passed through one-third of the length of the kiln the reaction mixture reached a temperature higher than that of the kiln wall, but the temperature did not exceed 300° C. at any point.

100 kg. of calcined material obtained under steady state conditions was then suspended in 500 liters of water and 52 kg. of sulphur dioxide were stirred into the suspension. The insoluble product was filtered, washed with water and dried at 60° C. The resulting end-product, when bone-dry, weighed 40 kg. and contained 2.5% sulphur and 3.4% ash.

The dry, de-ashed ligneous end-product is a brown free-flowing powder. It is insoluble in aqueous mineral acids, neutral water and non-polar solvents such as ether, but soluble in aqueous alkaline solutions and in polar organic solvents or mixtures such as dimethyl formamide, formic acid and aqueous alcohol.

*Example 3*

Saturating kraft paper was impregnated with a solution of the lignin product obtained in Example 2 in 70% aqueous ethanol. The final lignin content of the paper was 42.5% by weight. The layers of such paper were pressed together at 150° C. and 1200 p.s.i. for 5 minutes. The resulting board had a modulus of rupture of 27,800 p.s.i., a modulus of elasticity of 1,400,000 p.s.i., an internal bond of 487 p.s.i. and a water absorption of 10.5% after 24 hours of soaking.

The pure de-ashed ligneous end-products may find use as binders for hard boards, fiber boards, or chip boards, and as components in mounting compounds and in adhesives. The de-ashed end-product may be used as an

| Calcination Temperature, °C. | Solubility in 70% ethanol, percent | Carbonyl Content, milliequivalents per gram | Total Hydroxyl Content, milliequivalents per gram | Methoxyl Content, milliequivalents/gm. | Sulphur Content, milliequivalents/gram | Reducing Groups, milliequivalents of glucose per gram |
|---|---|---|---|---|---|---|
| Starting Material | Nil | >0.1 | 4.00 | 5.70 | 1.84 | 1.23 |
| 247 | 93.5 | 0.45 | 4.10 | 4.84 | 0.73 | 1.50 |
| 280 | 96.8 | 0.88 | 4.75 | 4.02 | 1.10 | 1.80 |
| 300 | 94.0 | 1.57 | 6.10 | 3.05 | 0.87 | 3.40 |

The carbonyl groups were determined using the hydroxylamine method described by Eitel (J. Prakt. Chem. 159, 292 (1942)), and total hydroxyl groups by the acetylation method described by Freed and Wayne (Ind. Eng. Chem. Anal. Ed. 8, 278 (1936)).

Attempts to determine phenolic hydroxyl groups led to very unreliable results, but it seems obvious from the parallel increase in hydroxyl and decrease in methoxyl that the majority of the newly formed hydroxy group result from demethylation and are thus phenolic.

Reducing groups were determined using a modified Somogyi method, as described by Sundman, Saarnio and Gustafson (Paper and Timber 4a, 115 (1951)).

*Example 2*

32 kg. of calcium oxide was stirred at 60° C. into 300 liters of sulphite waste liquor containing 200 kg. of solids. The resulting precipitate was filtered, dried and ground. The product was fed into a rotary kiln at a rate of 15 kg. per hour. The speed of rotation of the kiln and its inclination was so adjusted that a retention time of 2 hours was obtained. The kiln was equipped with thermocouples for measuring the temperature of the product and of the wall of the kiln at different points. The wall temperature of the kiln was held at 250° C. at extender in acidic adhesives and as a rubber filler. Alkaline solutions of the de-ashed end-product may find use as dispersants for clay, cement, carbon black, drilling mud used in oil wells, and other special purposes. The un-deashed heat treated reaction mixture may be used as extender in alkaline adhesives.

We claim:

1. In a process of obtaining highly reactive lignin products of high carbonyl and phenolic hydroxyl content, the step of heating a reaction mixture consisting of a lignin sulphonate salt and a solid alkaline reagent in the dry state at a temperature between 220° C. and 350° C.

2. The process of obtaining highly reactive lignin products of high carbonyl and phenolic hydroxyl content from waste sulphite liquor which comprises precipitating basic calcium lignin sulphonate from waste sulphite liquor with an excess of solid lime at temperatures not exceeding 100° C., drying the precipitated basic calcium lignin sulphonate, and heating the basic calcium lignin sulphonate at a temperature between 250° C. and 290° C.

References Cited in the file of this patent

UNITED STATES PATENTS

| 1,298,477 | Drewsen | Mar. 25, 1919 |
| 2,683,706 | Muller | July 13, 1954 |